United States Patent
Mann et al.

(10) Patent No.: US 8,888,884 B2
(45) Date of Patent: Nov. 18, 2014

(54) CARTRIDGE FILTER DIMENSIONAL COMPENSATOR

(71) Applicant: BHA Altair, LLC, Franklin, TN (US)

(72) Inventors: Richard Michael Ashley Mann, Basingstoke (GB); Stephen Francis Banks, Yateley (GB); Przemyslaw Krysztof Nikolin, Reding (GB); Timothy John Nicholas, Southampton (GB); Peter Thomas McGuigan, Alton (GB)

(73) Assignee: BHA Altair, LLC, Franklin, TN (US)

( * ) Notice: Subject to any disclaimer, the term of this patent is extended or adjusted under 35 U.S.C. 154(b) by 166 days.

(21) Appl. No.: 13/684,762

(22) Filed: Nov. 26, 2012

(65) Prior Publication Data

US 2014/0144320 A1    May 29, 2014

(51) Int. Cl.
*B01D 46/00* (2006.01)
*B01D 46/24* (2006.01)

(52) U.S. Cl.
CPC .......... *B01D 46/2411* (2013.01); *B01D 46/002* (2013.01); *B01D 46/2414* (2013.01); *B01D 46/0005* (2013.01); *B01D 2265/05* (2013.01)
USPC ............... 55/498; 55/484; 55/490; 55/510

(58) Field of Classification Search
CPC ............ B01D 46/0005; B01D 46/002; B01D 46/2411; B01D 46/2414
USPC ............... 55/484, 498, 510, 490; 95/273, 286
See application file for complete search history.

(56) References Cited

U.S. PATENT DOCUMENTS

| | | |
|---|---|---|
| 3,877,899 A | 4/1975 | Bundy et al. |
| 4,073,632 A | 2/1978 | Reinauer et al. |
| 4,251,244 A | 2/1981 | Evenstad |
| 5,308,485 A | 5/1994 | Griffin et al. |
| 5,964,909 A * | 10/1999 | Brunner .................... 55/377 |

* cited by examiner

*Primary Examiner* — Robert Clemente
(74) *Attorney, Agent, or Firm* — Reinhart Boerner Van Deuren P.C.

(57) ABSTRACT

A cartridge filter insert includes a body, an internal opening, and an exterior surface. The internal opening is configured to permit an airflow through the body. The exterior surface is configured to removably engage a surface of a cartridge filter having an outlet. The internal opening has an inside dimension smaller than an inside dimension of the outlet of the cartridge filter to effectively reduce the inside dimension of the outlet. An inlet filter house including the cartridge filter and the cartridge filter insert are also provided. Methods of filtering a fluid using the cartridge filter and the cartridge filter insert within the inlet filter house are also provided.

17 Claims, 5 Drawing Sheets

CARTRIDGE FILTER DIMENSIONAL COMPENSATOR

BACKGROUND OF THE INVENTION

1. Field of the Invention

The invention relates to filter elements for inlet filter houses, and specifically relates to different filter element size requirements among different filter housings.

2. Discussion of Prior Art

Filter elements can be used to provide clean fluid, such as air, to or from various devices. Such devices can include gas turbines where clean air over a long service life of the gas turbine is important. Filter elements such as cartridge filters can be used within an inlet filter house to filter contaminants from an air flow prior to introduction into an associated gas turbine. The cartridge filters each have a respective diameter at an open end. Cartridge filters of a particular diameter are held in place in the filter house and the particular diameter dimension of the cartridge filters is determined by design of the respective filter house.

However, it can be desirable to install a cartridge filter of a diameter other than the diameter originally chosen for overall system requirements. Implementation of a new diameter cartridge filter into an inlet filter house designed for a smaller diameter cartridge filter can require modifications to the cartridge filter requiring additional seals. Furthermore, there may be a significant amount of time the gas turbine must remain in an off-line condition in order to make physical modifications concerning such additional seals. In addition or alternatively, if the cartridge filters are supported against a tube sheet within an inlet filter house, the tube sheet may need to be changed in order to accommodate the larger diameter cartridge filters. As a result, there are benefits for continual improvements in filter technologies so as to address these and other issues.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a cartridge filter insert including a body. The body has an internal opening formed therein and the internal opening is configured to permit an airflow through the body. The cartridge filter insert also includes an exterior surface. The exterior surface is configured to removably engage a surface of a hollow cartridge filter having an outlet. The internal opening has an inside dimension smaller than an inside dimension of the outlet of the cartridge filter to effectively reduce the inside dimension of the outlet. The dimensions of the internal opening are configured to removably engage a mounting structure attached to a tube sheet, and center the cartridge filter around an aperture in the tube sheet.

Another aspect of the invention provides an inlet filter house including a housing having an inlet side and an outlet side. The inlet filter house also includes a plurality of hollow cartridge filters. The inlet filter house further includes a tube sheet forming a wall on the outlet side, the tube sheet supporting the plurality of cartridge filters extending into the housing. Each of the cartridge filters includes an outlet. The inlet filter house further includes a cartridge filter insert, the cartridge filter insert including a body having an internal opening formed therein. The internal opening is configured to permit an airflow through the body. The cartridge filter insert further includes an exterior surface, wherein the exterior surface is configured to removably engage a surface of a hollow cartridge filter. The internal opening has an inside dimension smaller than an inside dimension of the outlet of the cartridge filter to effectively reduce the inside dimension of the outlet. The dimensions of the internal opening are configured to removably engage a mounting structure attached to a tube sheet, and center the cartridge filter around an aperture in the tube sheet.

Another aspect of the invention provides a method of filtering a fluid including the step of providing an inlet filter house. The inlet filter house includes a housing having an inlet side and an outlet side. The inlet filter house further includes plurality of hollow cartridge filters. The inlet filter house also includes a tube sheet forming a wall on the outlet side, the tube sheet supporting a plurality of hollow cartridge filters extending into the housing. Each of the plurality of hollow cartridge filters includes an outlet. The method further includes the step of placing a cartridge filter insert in removable engagement with a cartridge filter. The cartridge filter insert includes a body, having an internal opening. The internal opening is configured to permit an airflow through the body. The cartridge filter insert further includes an exterior surface. The exterior surface is configured to removably engage a surface of a hollow cartridge filter. The internal opening has an inside dimension smaller than an inside dimension of the outlet of the cartridge filter to effectively reduce the inside dimension of the outlet. The dimensions of the internal opening are configured to removably engage a mounting structure attached to a tube sheet, and center the cartridge filter around an aperture in the tube sheet. The method still further includes the step of filtering an airflow using the cartridge filter and cartridge filter insert located within the inlet filter house.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

Figure 1:
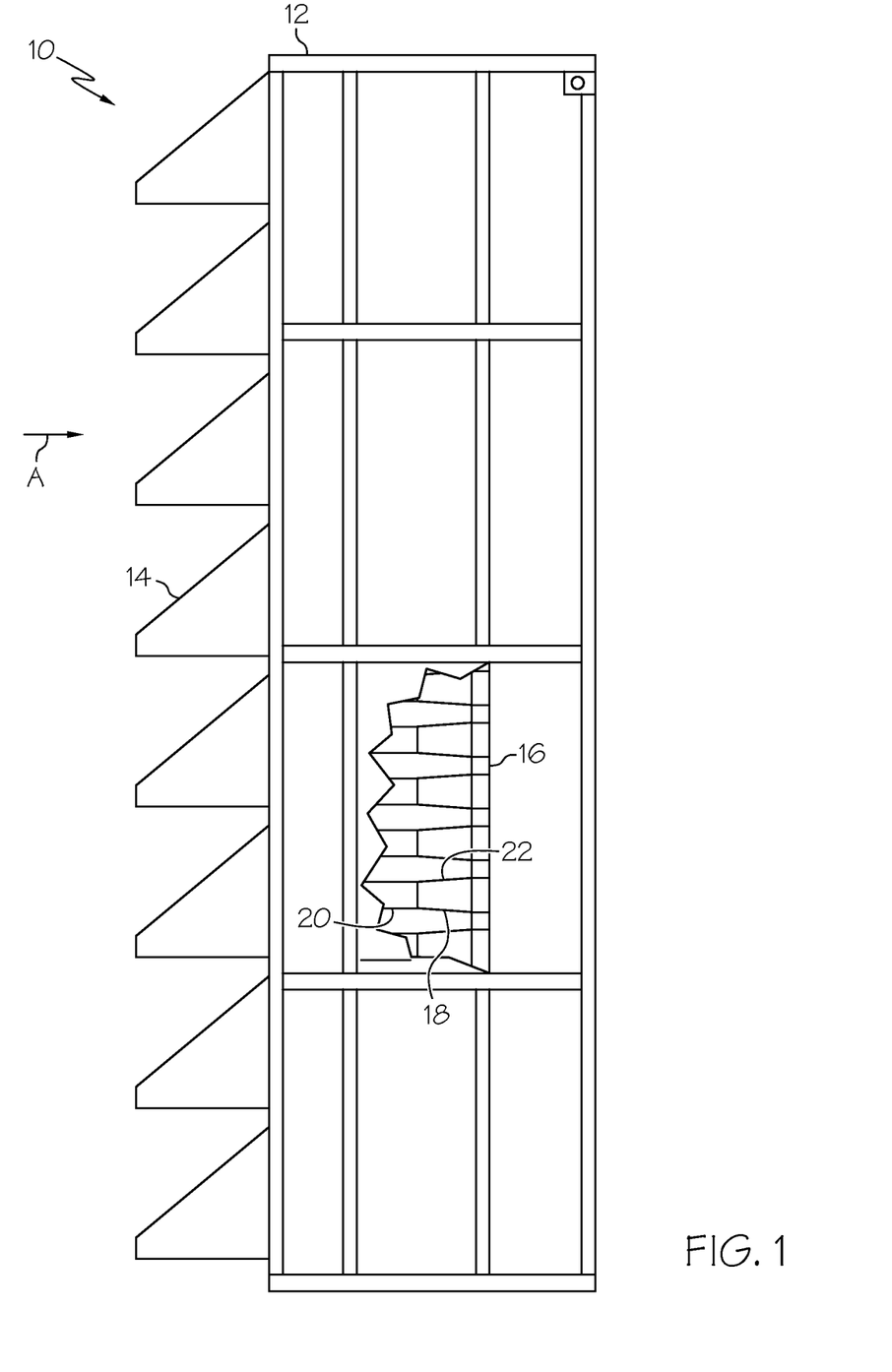
FIG. 1 is a schematized view of an example inlet filter house with a torn-away portion through a housing to view cartridge filters installed on a tube sheet.

An example of an inlet filter house 10 in accordance with aspects of the present invention is schematically shown in FIG. 1. It is to be appreciated that the examples presented herein are for illustrative purposes only and need not present specific limitations upon the scope of the present invention. In one example, the inlet filter house 10 is used to remove impurities from a fluid (e.g., an air stream) entering a gas turbine for power generation applications.

A typical inlet filter house 10 includes a housing 12 having an inlet side provided with a plurality of inlet hoods 14. The housing 12 has an outlet side that includes a tube sheet 16 forming a wall on the outlet side. The tube sheet 16 supports a plurality (e.g., hundreds) of cartridge-type, hollow filter elements extending into the housing 12 in cantilevered fashion. Each filter element 18 (FIG. 2) is associated with a passageway aperture 48 through the tube sheet 16 as will be appreciated.

Turning to the cartridge-type, hollow filter elements, these elements can be referred to as cartridge filters 18 for simplicity. Each cartridge filter 18 (best seen in FIG. 2) can be formed to have a variety of shapes (e.g., cylindrical). The shown example has a two part shape, with a generally cylindrical section 20 and a conical section 22. As mentioned, it is to be appreciated that the cartridge filter 18 can be formed with other shapes, including only a cylindrical section, only a conical section, etc. During normal operation, inlet air to the gas turbine flows into the inlet filter house 10 (FIG. 1) via the inlet hoods 14, and through the plural cartridge filters 18 in the direction of flow indicated by arrow A.

Turning back to FIG. 2, an example cartridge filter 18 installed on the tube sheet 16 is shown. Exterior surfaces 24 of the cylindrical section 20 and the conical section 22 serve as the airflow inlet for the cartridge filter 18, while the enlarged, open end of the conical section 22 abuts to the respective aperture through the tube sheet 16 and serves as the cartridge filter outlet 26. Any suitable means can be used to secure the cartridge filter 18 against the tube sheet 16. In one example, an internal tripod structure 32 including legs 34 can be employed to support and reinforce the cartridge filter 18. A gasketed threaded rod 36 can be located on the upstream terminus of the internal tripod structure 32. Mating hardware (not shown) such as a wing nut, locking nut, etc. can be mounted to the threaded rod 36 to help keep the cartridge filter 18 in a desired location against the tube sheet 16. Interaction between the threaded rod 36 and the mating hardware can also be used to apply a force to the cartridge filter 18 in a direction generally perpendicular to the tube sheet 16. This force can be used to at least partially compress a seal 40 (best seen in FIG. 3) between the cartridge filter 18 and the tube sheet 16. The seal 40 helps provide a barrier between a dirty side 44 (upstream) and a clean side 46 (downstream) of the air flow while also helping to prevent fluid (e.g., air) bypassing the cartridge filter 18.

Figure 2:
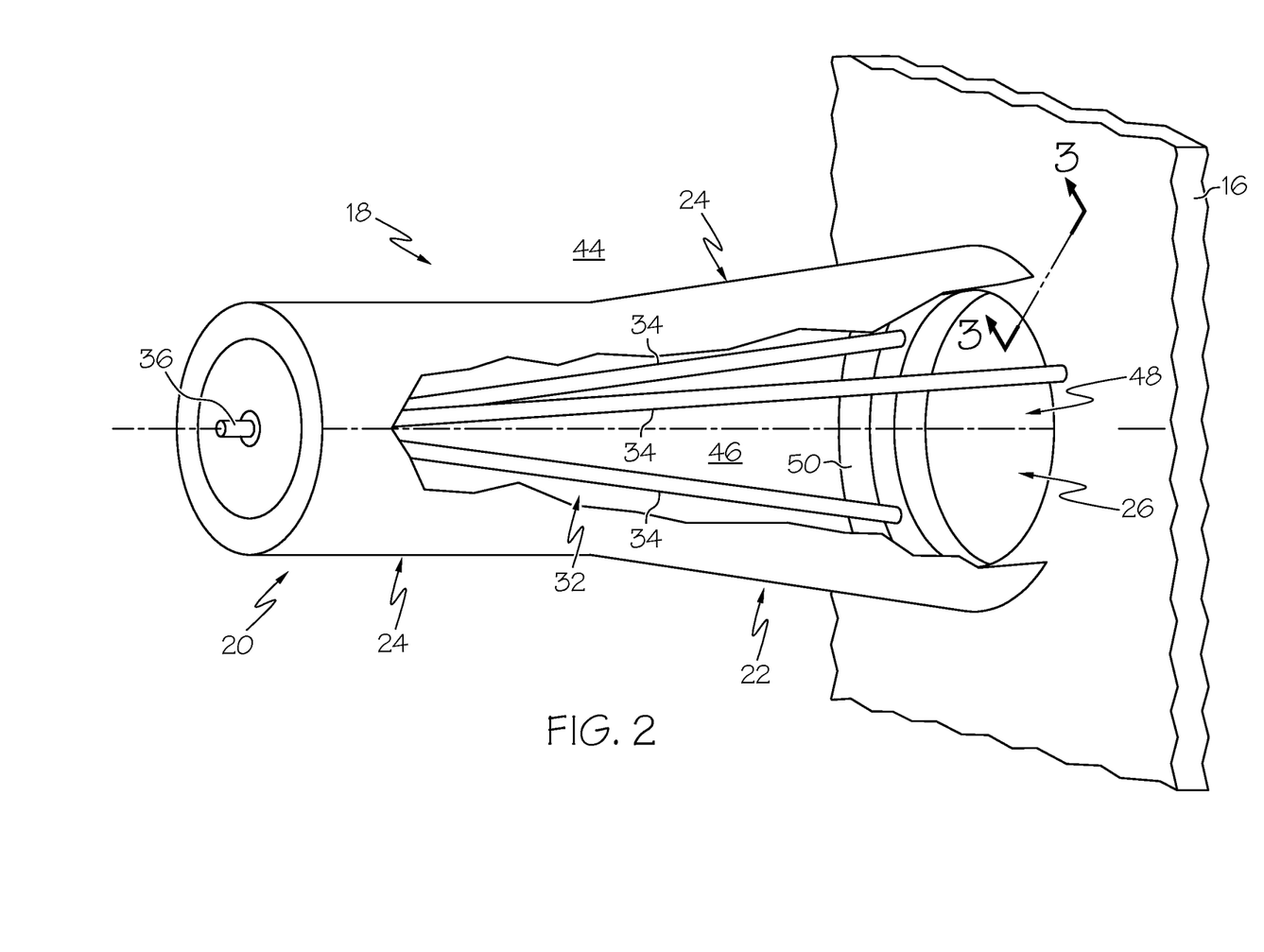
FIG. 2 is a perspective view of an example cartridge filter in the inlet filter house of FIG. 1.

The internal tripod structure 32 can be attached by any suitable means to the tube sheet 16 at the end opposite the threaded rod 36. Each leg 34 of the internal tripod structure 32 can be attached to the tube sheet 16 at locations relatively close to the edge of an aperture 48 in the tube sheet 16. In one example, the legs 34 help center the cartridge filter 18 over the aperture 48 by engaging an inner surface 50 of the cartridge filter 18. In one example, the surface 50 of the cartridge filter 18 is a surface corresponding to the inside diameter of the cartridge filter 18 at the cartridge filter outlet 26.

Figure 3:
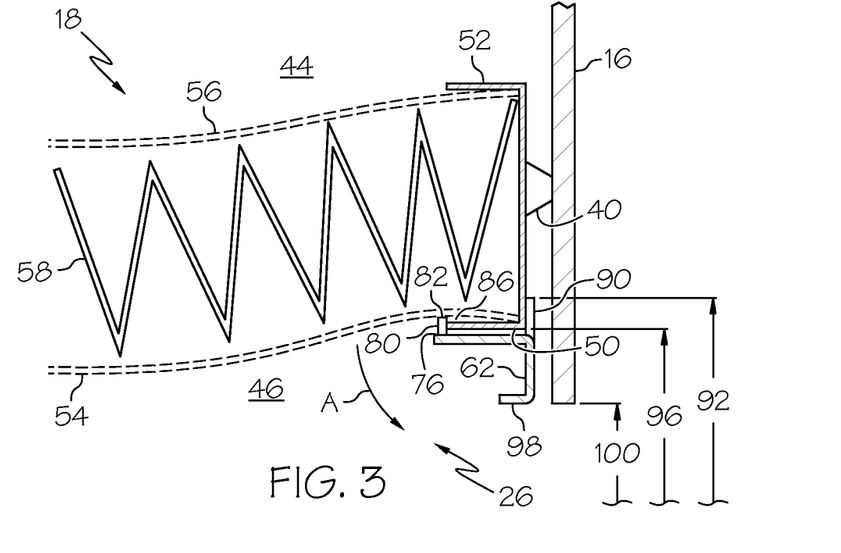
FIG. 3 is a partial cross-sectional view that relates to a view taken along lines 3-3 in FIG. 2, and shows example details of a portion of the cartridge filter and a portion of a cartridge filter insert in accordance with an aspect of the present invention.

Turning to FIG. 3, a partial cross-section detail shows some of the components of an example cartridge filter 18. An end cap 52 can cover the ends of an internal sleeve 54 and an external sleeve 56. In one example, the internal sleeve 54 and the external sleeve 56 can be constructed of expanded metal, however it is to be appreciated that other materials permeable by an inlet airflow can also be suitable for the internal sleeve 54 and the external sleeve 56. Within the annular space between the internal sleeve 54 and the external sleeve 56, a filter media 58 filters undesired contaminants from the airflow (represented by arrow A) as it flows through the cartridge filter 18. In one example, the filter media 58 can be a pleat pack as is known in the art, although other materials/configurations can also be suitable for the filter media 58. As previously described, the seal 40 can be mounted to the end cap 52 to help seal the cartridge filter 18 to the tube sheet 16 and provide a barrier between a dirty side 44 (upstream) and a clean side 46 (downstream) of the air flow.

Various inlet filter house designs can use various standard cartridge filter designs. For example, standard cartridge filter sizes can include 33 centimeter (13 inch) and 29 centimeter (11.5 inch) diameter cartridge filter outlets. In the event of a 33 cm (13 inch) cartridge filter being used in place of a 29 cm (11.5 inch) cartridge filter, the location of the legs on the internal tripod structure are not located widely enough to engage the surface of the cartridge filter on all three legs. Such lack of engagement may result in an inability to obtain centering of the cartridge filter 18. As a result, the seal may not work effectively, the cartridge filter can drop from its desired location possibly resulting in an un-filtered airstream that bypasses the cartridge filter, and the installation of the cartridge filters can be more difficult.

Figure 4:
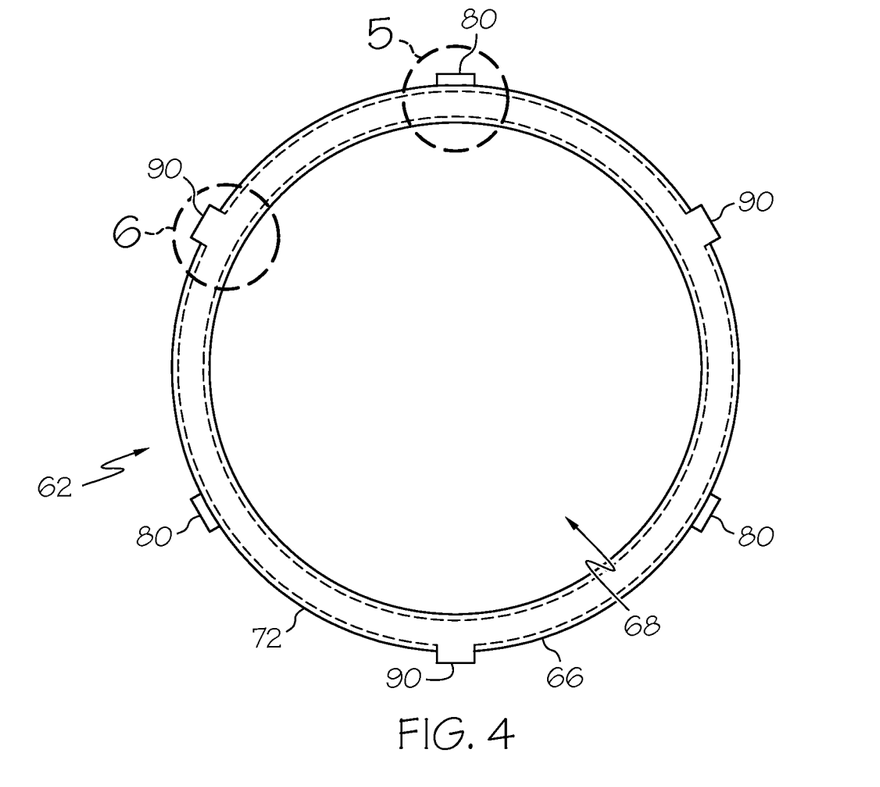
FIG. 4 is a plan view of the entire cartridge filter insert from FIG. 3.

At times, it can be desirable to utilize a standard cartridge filter 18 having a larger diameter cartridge filter outlet 26 than the diameter of the cartridge filter outlet designed for use in the inlet filter house 10. Turning now to FIG. 4, attention is focused on a cartridge filter insert 62. The cartridge filter insert 62 includes a body 66 having an internal opening 68. This internal opening 68 permits an airflow through the body 66 of the cartridge filter insert 62 as/after the airflow passes through the cartridge filter 18. After the airflow passes through the body 66 of the cartridge filter insert 62, it flows through the aperture 48 in the tube sheet 16 (best seen in FIG. 4) to downstream components, for example, the compressor stage of a gas turbine. In one example, the body 66 of the cartridge filter insert 62 has a generally annular shape, although other configurations are also contemplated.

Figure 5:
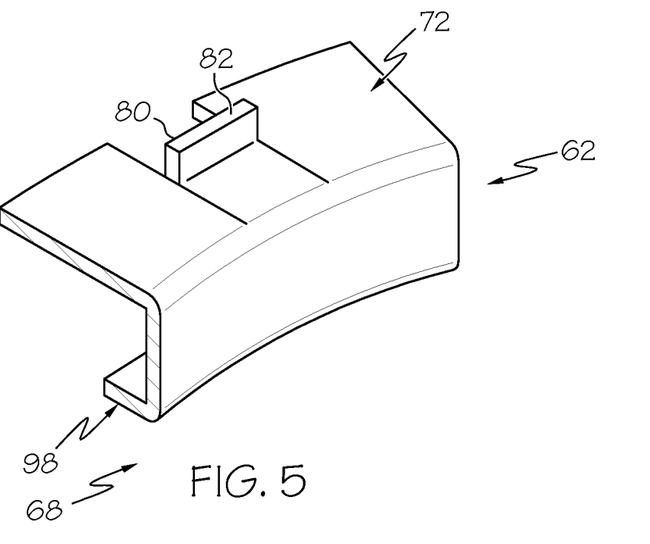
FIG. 5 is a detail view of a portion of the cartridge filter insert within the area designated 5 within FIG. 4 and shows example details of a clip of the cartridge filter insert.
Figure 6:
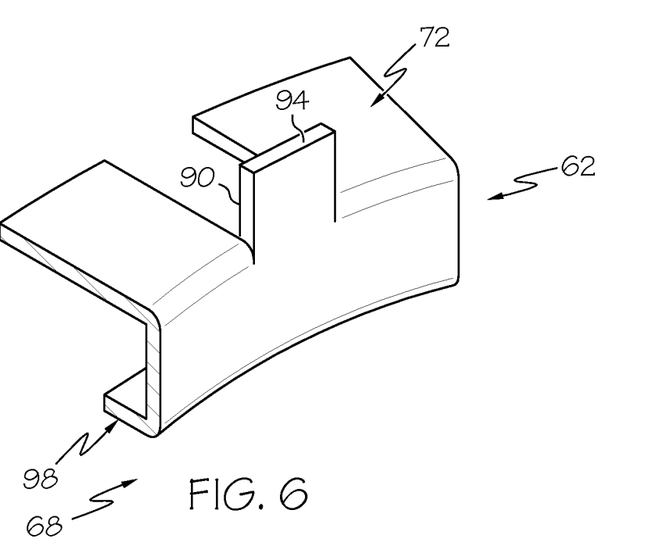
FIG. 6 is a detail view of a portion of the cartridge filter insert within the area designated 6 within FIG. 4 and shows example details of a lug from the cartridge filter insert of FIG. 4.

An exterior surface 72 defines the outer perimeter of the cartridge filter insert 62. In one example, the exterior surface 72 can simply be the outer edge of the body 66. As shown in FIGS. 3, 5-6, the exterior surface 72 can be formed by a portion of the body 66 that is formed to extend away from the body 66. In another example, the exterior surface 72 can be a separate component that is attached to the body 66. Returning to FIG. 3, a partial cross-section detail shows the exterior surface 72 removably engaging a surface 50 of the cartridge filter 18. In one example, the exterior surface 72 of the cartridge filter insert 62 can contact the surface 50 of the cartridge filter 18 directly so that a press fit between the two surfaces 72, 50 or friction help hold the cartridge filter insert 62 in place. As shown in FIG. 3, the exterior surface 72 of the cartridge filter insert 62 can remain a short distance from the surface 50 of the cartridge filter 18. Surface 50 at least partially defines the cartridge filter outlet 26. It is to be appreciated that because the cartridge filter insert 62 lies entirely within the clean side 46 of the airflow, no additional seals or fits requiring tight tolerances are required for proper operation of the cartridge filter 18.

Turning to FIG. 5, the cartridge filter insert 62 can also include at least one clip 80 which helps locate the cartridge filter insert 62 within the cartridge filter 18. In the shown example, the clip 80 can be formed between two slots 76 in the exterior surface 72 with a distal end 82 of the clip 80 formed to extend radially outward from the exterior surface 72. Other configurations of the clip are also contemplated. As shown in FIG. 3, a distal end 82 of the clip 80 can lock in place behind the upstream edge 86 of the end cap 52 of the cartridge filter 18. It is to be appreciated that the configuration of the clip 80 has enough flexibility to slightly flex radially inward as the cartridge filter insert 62 is engaged with the cartridge filter 18 so that the distal end 82 passes through the cartridge filter outlet 26. As shown in FIG. 4, a plurality of clips 80 can be equally spaced around the circumference of the cartridge filter insert 62, numbering three spaced about 120° from each other. Other quantities and arrangements of clips 80 are also contemplated.

Turning to FIG. 6, the cartridge filter insert 62 can also include at least one lug 90. The lug 90 can extend radially away from the exterior surface 72 of the cartridge filter insert 62. As best seen in FIG. 3, the lug 90 the distance 92 from the center of the cartridge filter insert 62 to the outermost edge 94 of the lug 90 is longer than the cartridge filter outlet inside dimension 96. The longer distance 92 creates a mechanical interference between the cartridge filter insert 62 and the cartridge filter 18 in order to help limit the insertion distance of the cartridge filter insert 62 into the cartridge filter 18. As shown in FIG. 4, a plurality of lugs 90 can be equally spaced around the circumference of the cartridge filter insert 62, numbering three spaced about 120° from each other. Other quantities and arrangements of lugs 90 are also contemplated. Additionally, the lugs 90 and the clips 80 can be equally spaced from each other, located about 60° from each other in an alternating pattern around the circumference of the cartridge filter insert 62.

The combination of the clip 80 and the lug 90 and their interaction with the end cap 52 help an operator properly engage the cartridge filter insert 62 with the cartridge filter 18 and secure the cartridge filter insert 62 in a desired location during cartridge filter 18 transport, installation, and operation. Additionally, the clip 80 and the lug 90 eliminate or reduce the need for further securement steps such as welding or using a separate mechanical fastener to secure the cartridge filter insert 62 within the cartridge filter 18. In other examples, other methods of securing the cartridge filter insert 62 within the cartridge filter 18 can be used, including application of an adhesive. Additional securement methods are also contemplated.

As shown in FIGS. 5 and 6, the internal opening 68 of the cartridge filter insert 62 can include a surface 98. This surface can be located at a particular radius from the center of the cartridge filter insert 62. In one example, the cartridge filter insert 62 can have an exterior surface 72 configured to engage a 33 cm (13 inch) cartridge filter 18 and have the surface 98 configured to replicate the dimensions of a 29 cm (11.5 inch) cartridge filter. With the cartridge filter insert 62 in place, the new, apparent cartridge filter outlet mimics that of a standard 29 cm (11.5 inch) cartridge filter and the surface 98 is configured to removably engage the internal tripod structure 32 attached to a tube sheet 16, and center the cartridge filter 18 around an aperture 48 in the tube sheet 16 (best seen in FIG. 2).

As can be seen in FIG. 3, an internal opening inside dimension 100 is smaller than the cartridge filter outlet inside dimension 96. Both dimensions 96, 100 are shown in FIG. 3 as foreshortened dimensions and portions of a diameter of a circle. However, it is to be appreciated that geometries of the cartridge filter outlet 26 and the internal opening 68 other than circular are also contemplated. Because the internal opening inside dimension 100 is smaller than a cartridge filter outlet inside dimension 96, insertion of the cartridge filter insert 62 effectively reduces the cartridge filter outlet from the filter outlet inside dimension 96 to the internal opening inside dimension 100. In one particular example, the internal opening inside dimension 100 is about 29.2 cm (11.5 in), and the cartridge filter outlet inside dimension 96 is about 33 cm (13 in).

The internal opening inside dimension 100 removably engage the internal tripod structure 32, which is one example of a mounting structure attached to the tube sheet 16. As a result, engagement of the cartridge filter insert 62 enables a cartridge filter of relatively large size (e.g., one having a cartridge filter outlet inside dimension 96 of about 33 cm (13 in)) to properly fit the internal tripod structure 32 of an inlet filter house 10 designed to employ a cartridge filter of a relatively small size (e.g. one having a cartridge filter outlet inside dimension 96 of about 29.2 cm (11.5 in)). In this way, the cartridge filter insert 62 dimensionally compensates for the difference between the relatively large size cartridge filter and the relatively small size cartridge filter.

As in the particular example shown in FIG. 2, the three legs 34 of the internal tripod structure 32 act to center the cartridge filter 18 around the aperture 48 in the tube sheet 16. Properly centered, the cartridge filter 18 has a greater likelihood of having an effective seal with the tube sheet 16. Installation of the cartridge filter 18 is also likely to be less difficult when it is properly centered, and the cartridge filter 18 is also less likely to drop from its desired location. A cartridge filter 18 that has dropped from its desired position can result in an airflow that bypasses the cartridge filter 18, resulting in undesired contaminants reaching downstream components.

Figure 7:
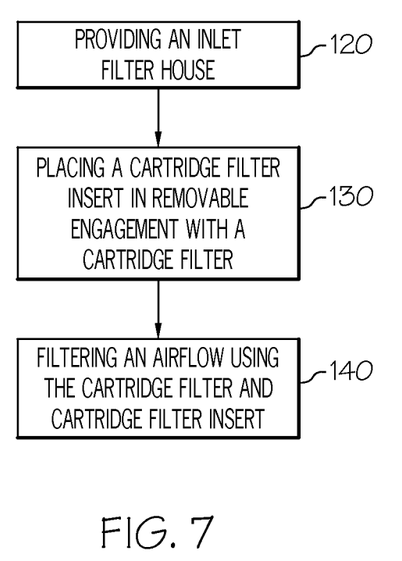
FIG. 7 is a top level flow diagram of an example method of filtering a fluid.

An example method of filtering a fluid is generally described in FIG. 7. The method can be performed in connection with the example inlet filter house 10 shown in FIG. 1 and the example cartridge filter insert shown in FIG. 3. The method includes the step 120 of providing an inlet filter house. As previously mentioned, the inlet filter house 10 can include a housing 12 having an inlet side provided with a plurality of inlet hoods 14. The housing 12 has an outlet side that includes a tube sheet 16 forming a wall on the outlet side. The tube sheet 16 supports a plurality (usually hundreds) of cartridge-type, hollow filter elements extending into the housing 12 in cantilevered fashion. Each of the plurality of hollow cartridge filters has an inlet and an outlet.

The method further includes the step 130 of placing a cartridge filter insert 62 in removable engagement with a cartridge filter 18. The exterior surface 72 of the cartridge filter insert 62 can remain a short distance from the surface 50 of the cartridge filter 18. It is to be appreciated that because the cartridge filter insert 62 lies entirely within the clean side 46 of the airflow, no additional seals or fits requiring tight tolerances are required for proper operation of the cartridge filter 18. Because the internal opening inside dimension 100 is smaller than the cartridge filter outlet inside dimension 96, insertion of the cartridge filter insert 62 effectively reduces the filter outlet inside dimension 96. The cartridge filter insert 62 dimensionally compensates for the difference between the relatively large size cartridge filter and the relatively small size cartridge filter.

The method further includes the step 140 of filtering an airflow using the cartridge filter 18 and cartridge filter insert 62 located within the inlet filter house 10. An airflow passes through the housing 12, through the exterior surfaces 24 of the cartridge filter 18 where particulate matter is removed from the airflow. The airflow continues by passing through the cartridge filter insert 62, the cartridge filter outlet 26, and the aperture 48 in the tube sheet 16. It is to be appreciated that there is to be little or no discernible difference between the filtration process of a relatively large cartridge filter 18 fitted with a cartridge filter insert 62 and the filtration process of a relatively small cartridge filter.

In the described examples, the methods and apparatus provide a relatively inexpensive means of enabling an operator of an inlet filter house 10 to utilize relatively large cartridge filters in place of relatively small cartridge filters. The described methods and apparatus provide one standard cartridge filter that can be used for multiple inlet filter houses designed to use that particular cartridge filter and cartridge filters of smaller diameter. This provides for reductions in design costs, reductions in stocking costs for multiple parts, and elimination of multiple mutable part numbers. The current standard cartridge filter can be stocked and subsequent orders calling for cartridge filters of smaller diameter can have a cartridge filter insert snapped into place prior to shipping and installation. The described examples also eliminate the need for costly time interruptions that may be required to rework a tube sheet in order to accept the standard cartridge filters when the tube sheet was designed to use cartridge filters of smaller diameter.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A cartridge filter insert including:
a body, having an internal opening formed therein, wherein the internal opening is configured to permit an airflow through the body; and
an exterior surface, wherein the exterior surface is configured to removably engage a surface of a hollow cartridge filter, the cartridge filter having an outlet, the internal opening having an inside dimension smaller than an inside dimension of the outlet of the cartridge filter to effectively reduce the inside dimension of the outlet, the dimensions of the internal opening configured to removably engage a mounting structure attached to a tube sheet, and center the cartridge filter around an aperture in the tube sheet; and,
wherein the body farther includes at least one clip configured to locate the cartridge filter insert within the cartridge filter.

2. The cartridge filter insert according to claim 1, wherein the body has a generally annular shape.

3. The cartridge filter insert according to claim 2, wherein the exterior surface has an outer diameter of about 33 centimeters (13 inches).

4. The cartridge filter insert according to claim 3, wherein the internal opening has an inside diameter of about 29.2 centimeters (11.5 inches).

5. The cartridge filter insert according to claim 1, wherein the body further includes at least one lug, the lug extending away from the exterior surface, the distance from the center of the cartridge filter insert to the outermost edge of the lug being longer than the radius of the cartridge filter outlet.

6. An inlet filter house including:
a housing having an inlet side and an outlet side;
a plurality of hollow cartridge filters;
a tube sheet forming a wall on the outlet side, the tube sheet supporting the plurality of hollow cartridge filters extending into the housing, each of the cartridge filters having an outlet; and
a cartridge filter insert, wherein the cartridge filter insert includes:
a body, having an internal opening formed therein, wherein the internal opening is configured to permit an airflow through the body; and an exterior surface, wherein the exterior surface is configured to removably engage a surface of a hollow cartridge filter, the internal opening having an inside dimension smaller than an inside dimension of the outlet of the cartridge filter to effectively reduce the inside dimension of the outlet, the dimensions of the internal opening configured to removably engage a mounting structure attached to a tube sheet, and center the cartridge filter around an aperture in the tube sheet.

7. The inlet filter house according to claim 6, wherein the body of the cartridge filter has a generally annular shape.

8. The inlet filter house according to claim 7, wherein the exterior surface has an outer diameter of about 33 centimeters (13 inches).

9. The inlet filter house according to claim 8, wherein the internal opening has an inside diameter of about 29.2 centimeters (11.5 inches).

10. The inlet filter house according to claim 6, wherein the body further includes at least one clip configured to locate the cartridge filter insert within the cartridge filter.

11. The inlet filter house according to claim 6, wherein the body further includes at least one lug, the lug extending away from the exterior surface, the distance from the center of the cartridge filter insert to the outermost edge of the lug being longer than the radius of the cartridge filter outlet.

12. A method of filtering a fluid including:
providing an inlet filter house including a housing having an inlet side and an outlet side, a plurality of hollow cartridge filters, a tube sheet forming a wall on the outlet side, the tube sheet supporting a plurality of cartridge filters extending into the housing, each of the cartridge filters having an outlet;
placing a cartridge filter insert in removable engagement with a cartridge filter, wherein the cartridge filter includes a body, having an internal opening formed therein, wherein the internal opening is configured to permit an airflow through the body, an exterior surface, wherein the exterior surface is configured to removably engage a surface of a hollow cartridge filter, the internal opening having an inside dimension smaller than an inside dimension of the outlet of the cartridge filter to effectively reduce the inside dimension of the outlet, the dimensions of the internal opening configured to removably engage a mounting structure attached to a tube sheet, and center the cartridge filter around an aperture in the tube sheet; and filtering an airflow using the cartridge filter and cartridge filter insert located within the inlet filter house.

13. The method according to claim 12, wherein the body of the cartridge filter has a generally annular shape.

14. The method according to claim 13, wherein the exterior surface has an outer diameter of about 33 centimeters (13 inches).

15. The method according to claim 14, wherein the internal opening has an inside diameter of about 29.2 centimeters (11.5 inches).

16. The method according to claim 12, wherein the body further includes at least one clip configured to locate the cartridge filter insert within the cartridge filter.

17. The method according to claim 12, wherein the body further includes at least one lug, the lug extending away from the exterior surface, the distance from the center of the cartridge filter insert to the outermost edge of the lug being longer than the radius of the cartridge filter outlet.

* * * * *

UNITED STATES PATENT AND TRADEMARK OFFICE
CERTIFICATE OF CORRECTION

| | | |
|---|---|---|
| PATENT NO. | : 8,888,884 B2 | Page 1 of 1 |
| APPLICATION NO. | : 13/684762 | |
| DATED | : November 18, 2014 | |
| INVENTOR(S) | : Richard Michael Ashley Mann et al. | |

It is certified that error appears in the above-identified patent and that said Letters Patent is hereby corrected as shown below:

In the Claims

Column 7, Line 63, Claim 1 the word "farther" should be corrected to read --further--.

Signed and Sealed this
Twenty-sixth Day of May, 2015

Michelle K. Lee
*Director of the United States Patent and Trademark Office*